United States Patent [19]

Pentith

[11] Patent Number: 4,696,391
[45] Date of Patent: Sep. 29, 1987

[54] CONVEYING APPARATUS

[75] Inventor: Gerald R. O. Pentith, Ashby de la Zouch, United Kingdom

[73] Assignee: Fletcher Sutcliffe Wild Ltd., United Kingdom

[21] Appl. No.: 897,659

[22] Filed: Aug. 8, 1986

[30] Foreign Application Priority Data

Aug. 20, 1985 [GB] United Kingdom ................ 8520817
Nov. 7, 1985 [GB] United Kingdom ................ 8527522

[51] Int. Cl.⁴ ............................................ B65G 23/14
[52] U.S. Cl. .................................................... 198/833
[58] Field of Search ................................ 198/817, 833

[56] References Cited

U.S. PATENT DOCUMENTS

| 1,528,557 | 3/1925 | Luce | 198/817 X |
| 1,970,842 | 8/1934 | Crossen | 198/833 X |
| 2,489,440 | 11/1949 | Vallance | 198/833 X |
| 2,732,930 | 1/1956 | Thomson | 198/833 X |
| 2,751,065 | 6/1956 | Thomson | 198/833 X |
| 3,424,297 | 1/1969 | Thomson | 198/833 |
| 4,609,099 | 9/1986 | Pentith | 198/833 |

FOREIGN PATENT DOCUMENTS

| 1797651 | 8/1959 | Fed. Rep. of Germany . |
| 3123147 | 12/1982 | Fed. Rep. of Germany . |
| 2385614 | 10/1978 | France . |
| 432231 | 7/1935 | United Kingdom | 198/833 |
| 628319 | 8/1949 | United Kingdom . |
| 711524 | 7/1954 | United Kingdom . |
| 770993 | 3/1957 | United Kingdom | 198/817 |
| 863911 | 3/1961 | United Kingdom | 198/833 |
| 1112785 | 5/1968 | United Kingdom . |
| 1126882 | 9/1968 | United Kingdom . |
| 1591461 | 6/1981 | United Kingdom . |
| 2154533 | 11/1985 | United Kingdom . |

Primary Examiner—Thomas F. Callaghan
Attorney, Agent, or Firm—Jones, Askew & Lunsford

[57] ABSTRACT

The apparatus comprises a continuous looped belt (10) having an upper run (11) for carrying a load and a return lower run (12). A single cable (100) is arranged over numerous pulleys to define two spaced parallel upper runs of cable (101) and two spaced parallel lower runs of cable (102) which support the belt runs (11, 12). The belt is broader than the spacing between the spaced runs of cable and seats on top of the cable. A cross-over arrangement (110) provides for the cable to form two identical and parallel cable portions defining the cable runs. All pulleys in one portion are mirrored by co-axial pulleys in the other portion, so that, at any point, the tension in one cable portion is equal to that in the other portion. A double drive roller arrangement reduces scuffing of the cable, so that the whole system substantially reduces wear of the cable.

10 Claims, 10 Drawing Figures

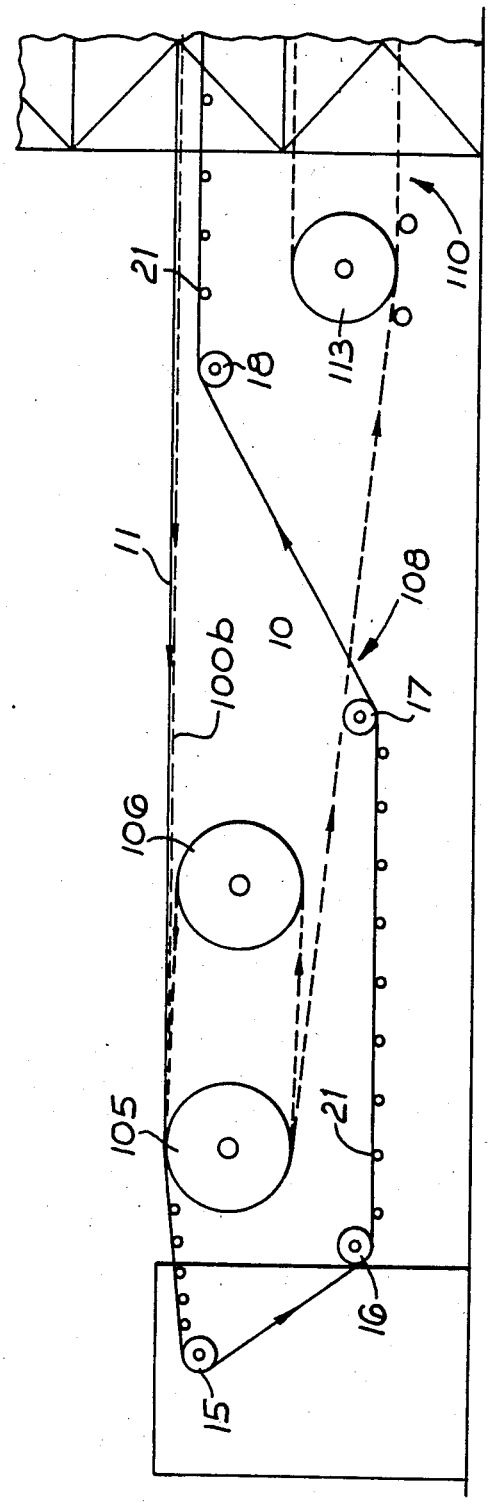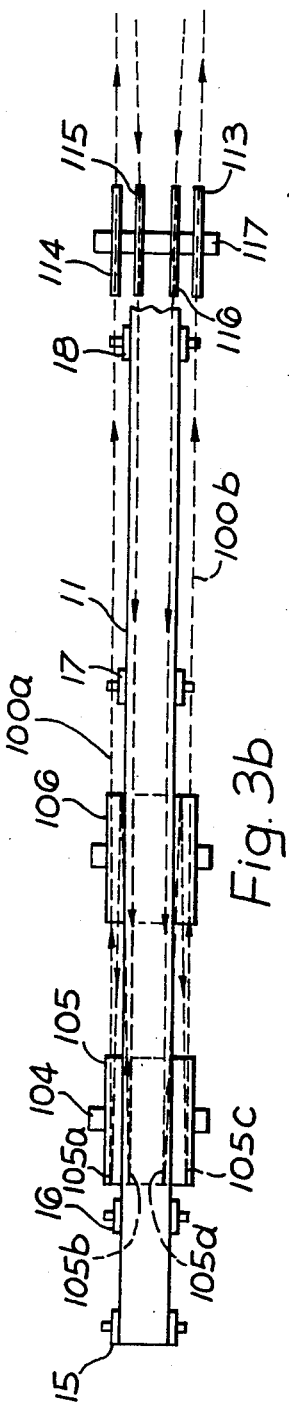
Fig. 3a
Fig. 3b

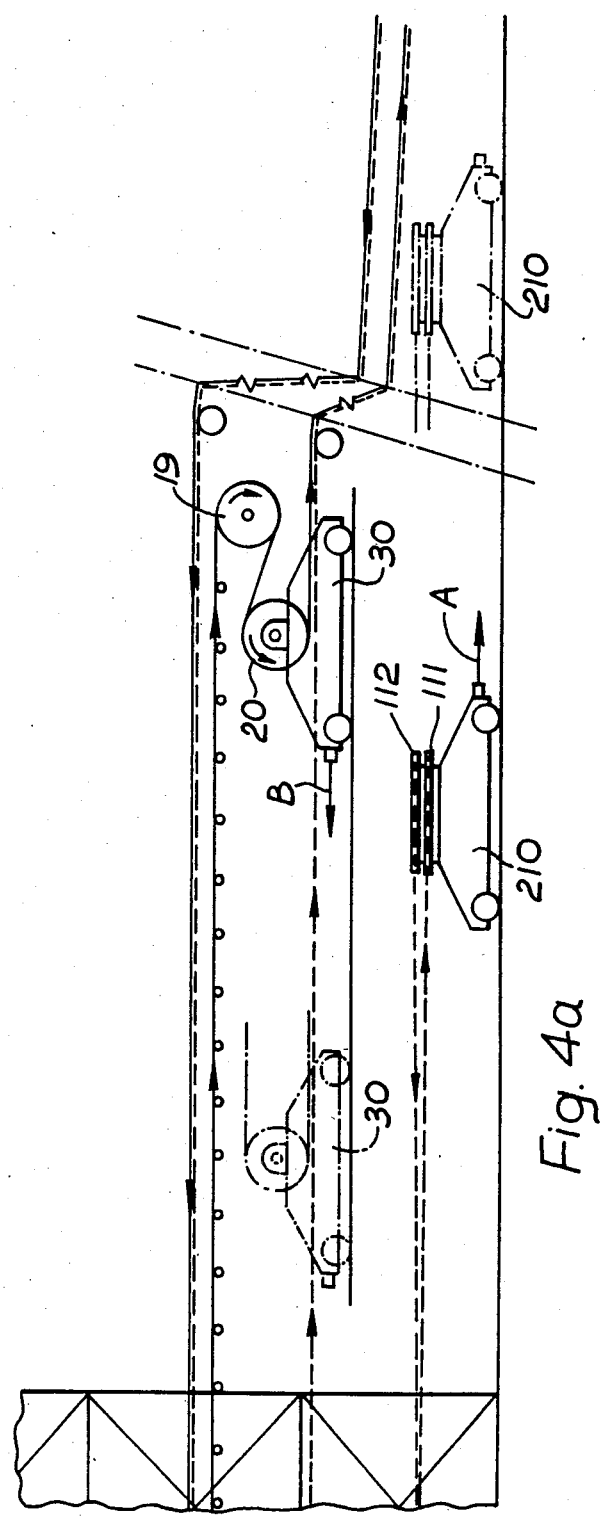
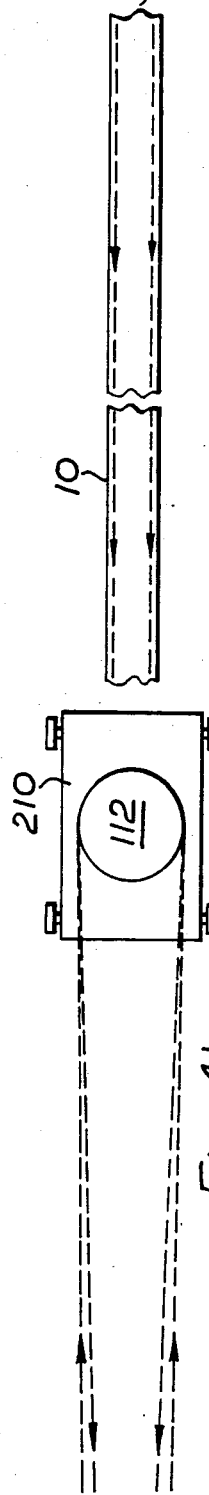
Fig. 4a
Fig. 4b

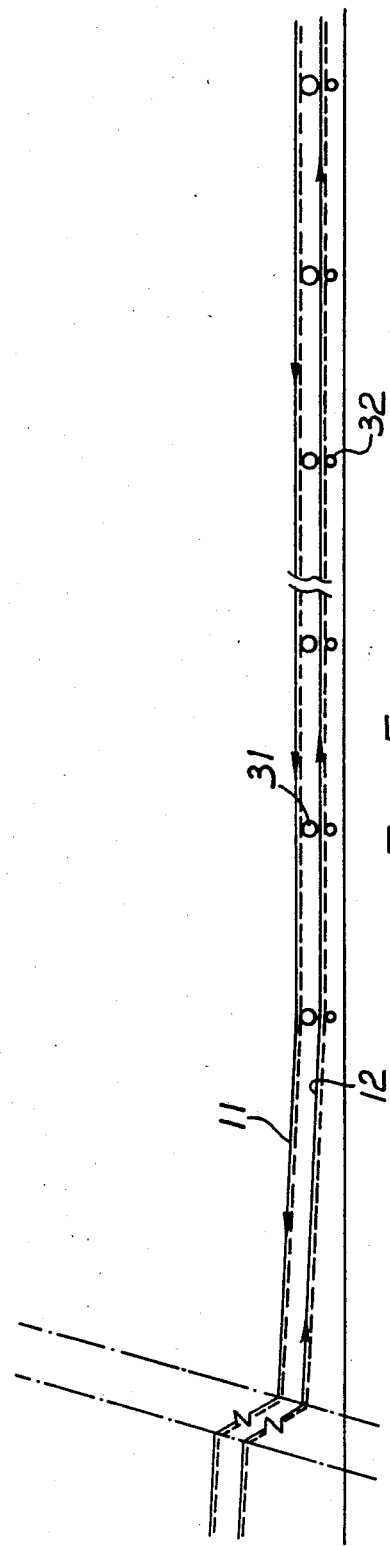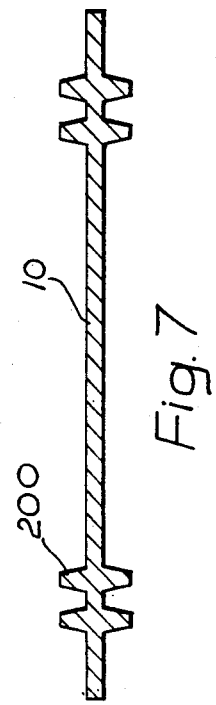

CONVEYING APPARATUS

DESCRIPTION

This invention relates to conveying apparatus of the type comprising a continuous looped belt, supported on cables, which are driven so as to drive the belt.

Conveying apparatus of this type is well known for conveying material over long distances, e.g. several kilometres, and is used for moving ores from quarries and mines. Such apparatus is disclosed for example in GB-A-1591461. In apparatus of this type, the lower run of the belt cannot be allowed to sag and the cables are arranged to support both the upper run and the return lower run. Two parallel pulley arrangements are used each supporting a respective continuous cable. The cables are moved apart near the driven and return ends to permit the belt to pass between the cables for the purpose of guiding the return run of the belt onto the lower run of the cables.

The cables are usually steel ropes, but could be of any construction suitable for withstanding the stresses involved in carrying the loaded belt.

It is usual to drive the two cables by means of a winch. The cables are wrapped around a special track on the winch and are under high tension. It is essential that the tensions in the two cables are substantially the same and that they are driven at the same speed. In practice, this is very costly to achieve and a special differential gearing device is used, which is extremely expensive.

It would clearly be advantageous to avoid the necessity to provide this gearing device and one object of the invention is to achieve this end.

It was proposed many years ago, in 1945, in GB-A-628319 to overcome the problem of trying to maintain two cables running at the same speed by using a single cable forming two spaced, parallel lengths to support the upper run of the belt and forming similar spaced, parallel lengths to support the lower run of the belt. The use of a single cable was believed to equalise the tensions in each of the parallel lengths of cable supporting the belt, so that the lengths of cable at each side of the belt were bound to run at the same speed.

Although this appears to be theoretically correct, in practice, problems arise due to the substantial length of the cable. In the arrangement illustrated in FIG. 1 of GB-A-628319, the cable is acted on by different forces in different parts of the cable and some parts stretch more than others, so that the two lengths would not, in fact, run at equal speeds, except that the ropes are interconnected by cross members which tend to overcome the imbalance. These cross members are secured to the belt and have heads at their ends. These heads have jaws for gripping the cables and wheels for running on rails. The upper run of the belt is carried on the two parallel lengths of the cable and then transfers to the rails. Whilst the belt is carried on the cable, the two lengths are firmly interconnected at frequent intervals by the cross members through the jaws. This arrangement is very expensive and, until the advent of the present invention, it has been preferred to avoid such expensive constructions, to carry the belt directly on two separate cables and to use differential gearing, as disclosed in GB-A-1591461.

A proposal to use a single cable to provide two spaced parallel lengths to support an upper run of a belt was made in 1923 in US-A-1528557. This proposal was concerned only with short conveyors in which the problem is much less acute than in long conveyors. The proposal was concerned only with supporting the upper run of the belt and no provision was made for supporting the lower run of the belt due to its very short length. The proposal would be impractical for a long conveyor and the problems of different running speeds of the two parallel lengths of the cable would not be overcome.

The present invention overcomes these problems associated with the prior art apparatus and is defined in Claim 1, wherein the preamble is based on the disclosure of GB-A-628319 and the features distinguishing the invention from that disclosure are set out as characterising features.

The use of a winch to drive the cable also causes a problem. The winch wheel has a smooth circumferential surface and the cable moves axially of the wheel between its input position and its output position. The diameter reduces in diameter in the axial direction. This arrangement allows the gap between the two lengths of cable to open up so that the belt can pass between for the return run. This causes rubbing of the cable on the winch wheel and rubbing of adjacent coils of the cable and this contributes substantially to wear of the cable and damages splices.

In order to avoid this problem, there is provided a drive arrangement for the cable comprising at least two radially spaced wheel arrangements, each wheel arrangement having first and second axially spaced tracks for each cable portion, the latter passing twice over both wheel arrangements and passing from the first track of one wheel arrangement to the second track of the other wheel arrangement. The cable is moved angularly as it moves from one track to another without rubbing in an action called "fleeting".

Reference is now made to the accompanying drawings, wherein:-

FIG. 3a is a side elevation of the drive end of the apparatus;

FIG. 3b is a plan view of the drive end of the apparatus;

FIG. 4a is a side elevation of a part of the apparatus including tensioning means for the cable and the belt;

FIG. 4b is a plan view of a part of the apparatus shown in FIG. 4a;

FIG. 5 is a side elevation of a portion of the main conveying part of the apparatus;

FIG. 7 is a sectional view of the belt showing formations for engagement with the cable.

Figure 1:
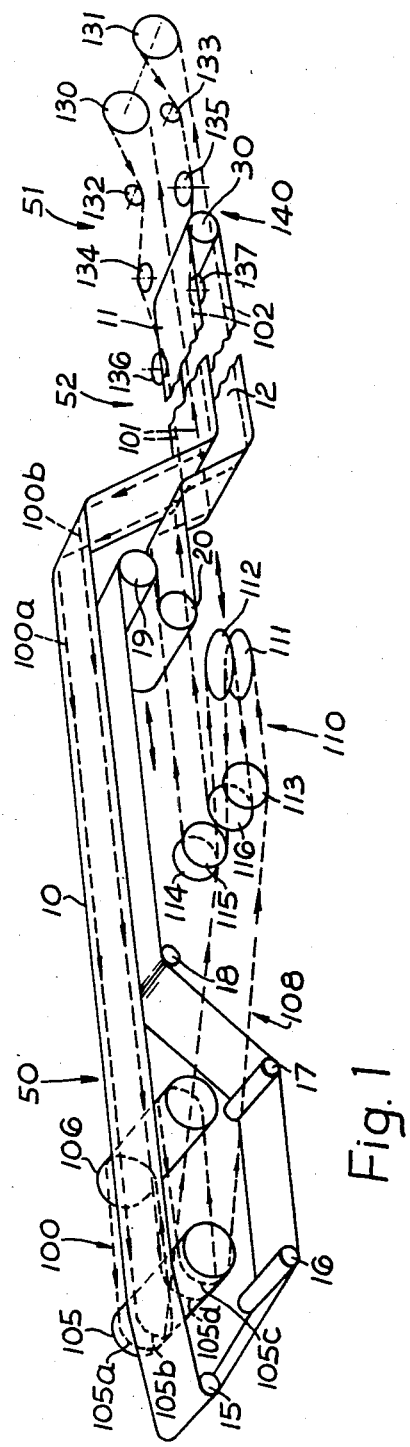
FIG. 1 is a perspective view of a conveying apparatus according to the invention.
Figure 2:
FIG. 2 is a view showing the track taken by a belt support cable of the apparatus.

With reference to FIG. 1, several wheels are illustrated some of which engage a conveyor belt 10 and others of which engage a belt support cable 100. Those wheels engaging the belt have two-digit references, whereas those wheels engaging the cable have three-digit references. The framework for supporting the wheels is omitted for clarity, but such frameworks are well known in the art. Similarly, the detail construction of pulley wheels and their mounting is conventional.

In FIG. 1, the drive end 50 of the apparatus dominates the view and, together with the return end 51, occupies most of the Figure. In practice, the major conveying part of the conveyor is the short broken section 52 shown in the Figure.

The cable 100 is guided to form two spaced, parallel moving portions 100a, 100b for supporting the belt 10 near its lateral edges. These portions define an upper run 101 and a lower run 102. The belt 10 is in a continuous loop and has an upper run 11, supported on the upper run 101 of the cable portions, and a lower run 12 supported on the lower run 102 of the cable portions.

The drive end 50 (see also FIGS. 3a and 3b) includes drive means having first and second parallel, axially spaced drive wheel arrangements 105, 106 provided with grooved tracks for locating the cable 100. Both of these wheel arrangements are driven and each wheel arrangement comprises a pair of wheels on a common shaft 104.

Each wheel arrangement has first and second pairs of adjacent tracks, each pair including a radially outer track and a radially inner track, such as 105a, 105b and 105c, 105d respectively on the wheel arrangement referenced 105. Each pair of tracks is associated with one of the two cable portions 100a, 100b.

The upper run of the cable portion 100a passes over the second drive wheel arrangement 106 on the associated inner track, over the first drive wheel arrangement 105 on the associated inner track 105b, back under and around the second drive wheel arrangement 106 on the associated outer track and back over and around the first drive wheel arrangement 105 on the associated outer track 105a, from where the cable portion passes downwardly away from the drive wheel arrangements to form the lower run. The other cable portion 100b is similarly double wrapped around the wheel arrangements on the other track pairs, including the tracks referenced 105c and 105d.

The outer tracks, such as 105a, 105c, are located outside the width of the belt 10, so that the cable portions, where they downwardly leave these tracks (at 108) are spaced sufficiently for the belt 10 to pass between the cable portions.

From the position 108, the cable portions run to a cross-over assembly 110. The cross-over assembly comprises, for each cable portion, a horizontal pulley wheel 111, 112, a vertical guide pulley wheel 113, 114 for guiding the cable portion to the horizontal pulley wheel, and a reversing pulley wheel 115, 116 for restoring the direction of movement of the cable portion. The cable portions thereby cross-over at this position and this arrangement permits the cable portions to be defined by a single cable.

As shown in FIGS. 1 and 4a, the two horizontal pulley wheels 111, 112 are co-axially located and the other four vertical pulley wheels 113 to 116 of the cross-over assembly are similarly co-axially located and mounted on a common shaft 117 (FIG. 3b). The reversing pulley wheels 115, 116 are spaced inwardly from the lead-in wheels 113, 114 and restore the cable portions to the appropriate spacing for supporting the belt 10. The horizontal pulley wheels 111, 112 need not be in perfect axial alignment and axial spacing of the wheels by a distance equal to or a little greater than the cable diameter may be appropriate to prevent the cable portion engaged on the upper wheel rubbing on the cable portion engaged on the lower wheel.

The cross-over assebly 110 also serves for maintaining tension in the cable. The horizontal pulley wheels 111, 112 are mounted on a trolley 210 which is movable to change tension in both cable portions 100a, 100b simultaneously and equally.

The upper run 11 of the belt 10 passes over the drive wheel arrangements 105, 106 and is taken off the upper run of the cable 100 by a wheel 15. Other wheels 16, 17, 18 guide the belt back under the drive wheels and up between the cable portions at the position 108 where these portions are spaced apart to a greater extent than the width of the belt. Numerous rollers 21 support the belt between the guide wheels and carry the lower run of the belt beneath the upper run and over the top of the cross-over assembly 110, the lower run of the belt rejoining the cable, for support by the lower run of the cable, after the cable portions leave the cross-over assembly at the restored spacing for supporting the belt.

Before the belt rejoins the cable, it passes over tensioning rollers 19, 20 (FIGS. 1 and 4a), one 19 of which is fixed and the other 20 of which is mounted on a trolley 30. The trolley is movable to maintain tension in the belt.

Over the main section 52 of the apparatus (FIGS. 1, 5a and 5b), the lower run 12 of the belt is supported on the lower runs of the cable and lies parallel to and directly under the upper run 11 of the belt on the upper runs of the cable. The runs of the cable are supported on pulleys 31, 32, those 31 supporting the upper run being more substantial and numerous than those 32 supporting the lower run, since the upper run has to carry loads.

Figure 6A:
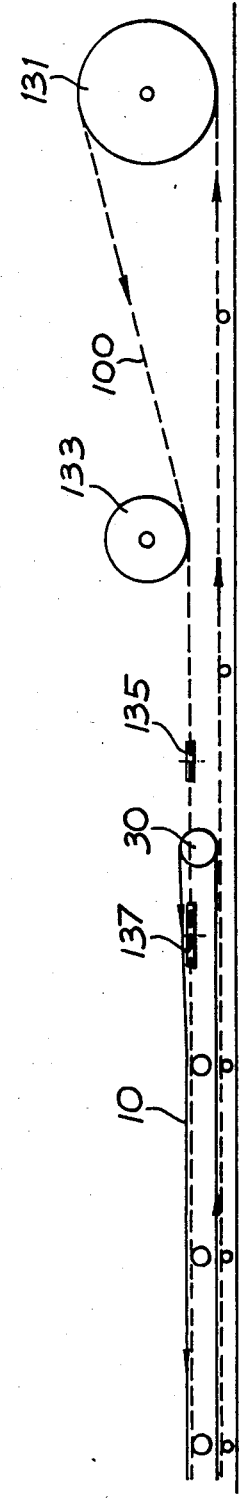
FIG. 6a is a side elevation of the return end of the apparatus.
Figure 6B:
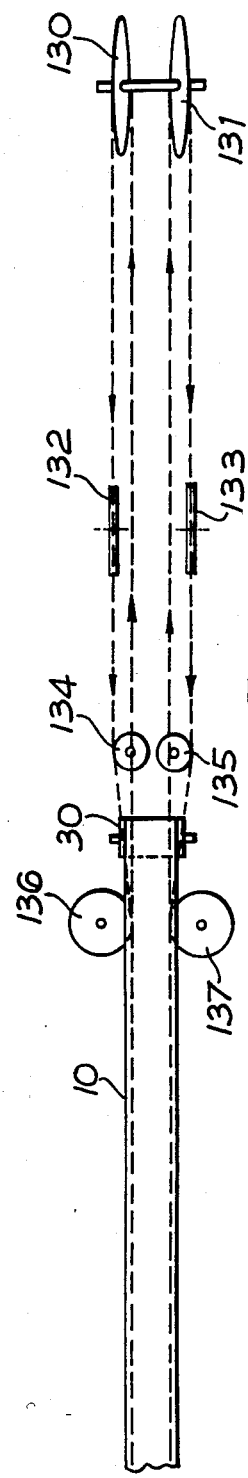
FIG. 6b is a plan view of the return end of the apparatus.

The return end 51 (FIGS. 1, 6a and 6b) comprises a pair of return pulley wheels 130, 131 over which the cable portions 100a, 100b pass between the lower run and the upper run. These return pulley wheels are angled relative to the horizontal and the vertical, such that the lower run of the cable joins the wheels at the spacing for supporting the belt, whereas they leave the wheels, in the reverse direction to form the upper run, at a wider spacing than the width of the belt. Guide wheels 132 and 137 guide the initial upper run of the cable back to the width required for supporting the belt. At the position 140 between horizontal guide wheels 134, 135 and 136, 137, where the cable portions converge, the belt can pass between the cable portions.

The return end also comprises a return wheel 30 which returns the lower run of the belt 10 to the upper run. The return wheel 30 is located at the position 140 and the belt passes up between the cable portions at this position.

As shown in FIG. 7, the belt 10 has longitudinal formations 200 spaced laterally in from the edges of the belt. These formations are provided on both upper and lower surfaces of the belt. The lower formations engage with the lower runs of the cable and the upper formations engage with the lower runs of the cable.

The apparatus described ensures that the two cable portions 100a, 100b run at equal speeds and that tensions are equalised between the two portions at any two parallel points. This prevents "hunting" and therefore substantially reduces wear without the need for differential gearing between the two sides of the apparatus. "Hunting" is an oscillation which can occur due to unequal speeds in the two cable portions where the portions are under load. This oscillation is caused by the tendency towards equalisation with slippage and can rapidly wear out the cable.

The drive means firmly gris the cable and positively guides the cable between the upper and lower runs, so that rubbing of the cable and consequent damage is minimised.

I claim:

1. Conveying apparatus comprising a continuous looped belt supported on cable portions in turn supported on pulley arrangements, the cable portions being driven by drive means to form upper and lower runs which support upper and lower runs of the belt, the cable portions forming part of a single cable and reversing pulleys and cross-over pulleys being provided for guiding the cable from each of the pulley arrangements to the other pulley arrangement, characterised in that the belt has formations within its width which seat on the cable portions, means are provided for divergently guiding the cables at specific locations to allow the belt to pass between the cable portions, and the pulley arrangements for the two cable portions are parallel, so that the lengths of cable in one cable portion are equal to corresponding lengths of cable in the other cable portion between the drive means and return pulleys, between the return pulleys and the reversing pulleys, between the reversing pulleys and the cross-over pulleys and between the cross-over pulleys and the drive means.

2. Conveying apparatus according to claim 1, wherein the cross-over pulleys are horizontal and generally co-axial and serve to guide a corresponding cable portion from one pulley arrangement to the other pulley arrangement whilst reversing its direction of travel, and the reversing pulleys for restoring the original direction of travel are co-axial and vertical.

3. Conveying apparatus according to claim 2 including guide means for divergently moving the cable portions to permit the belt to pass therebetween, the vertical guide pulleys being located at a spacing for restoring the spacing of the cable portions for supporting the belt.

4. Conveying apparatus according to claim 1, including tensioning means which acts simultaneously and equally on both cable portions, tensioning means comprising an adjustably movable device which carries the cross-over pulleys.

5. Conveying apparatuus according to claim 2, including tensioning means which acts simultaneously and equally on both cable portions, tensioning means comprising an adjustably movable device which carries the cross-over pulleys.

6. Conveying apparatus according to claim 1, wherein the drive means comprises at least two radially spaced wheel arrangements each having tracks for the cable including outer and inner tracks, the cable portions passing at least twice around the wheel arrangements in said tracks and the inner and outer tracks on one wheel arrangement being axially offset from the corresponding tracks of the other wheel arrangement.

7. Conveying apparatus according to claim 5, wherein the drive means comprises at least two radially spaced wheel arrangements each having tracks for the cable including outer and inner tracks, the cable portions passing at least twice around the wheel arrangements in said tracks and the inner and outer tracks on one wheel arrangement being axially offset from the corresponding tracks of the other wheel arrangement.

8. Conveying apparatus according to claim 3, wherein the drive means comprises at least two radially spaced wheel arrangements each having tracks for the cable including outer and inner tracks, the cable portions passing at least twice around the wheel arrangements in said tracks and the inner and outer tracks on one wheel arrangement being axially offset from the corresponding tracks of the other wheel arrangement, and wherein the divergence of the cable portions is provided by movement of the cable portions from said inner tracks to said outer tracks.

9. Conveying apparatus comprising a continuous looped belt supported on cable portions in turn supported on pulley arrangements, the cable portions being driven by drive means to form upper and lower runs which support upper and lower runs of the belt, the cable portions forming part of a single cable and reversing pulleys and cross-over pulleys being provided for guiding the cable from each of the pulley arrangements to the other pulley arrangement, wherein the drive means comprises at least two radially spaced wheel arrangements each having tracks for the cable including outer and inner tracks, the cable portions passing at least twice around the wheel arrangements in said tracks and the inner and outer tracks of one wheel arrangement being axially offset from the corresponding tracks of the other wheel arrangement.

10. Conveying apparatus according to claim 9, wherein divergence of the cable portions is provided by movement of the cable portions from said inner tracks to said outer tracks.

* * * * *